W. P. BENDING.
PROCESS OF TREATING HYDROCARBON OILS.
APPLICATION FILED DEC. 14, 1908.
998,670.
Patented July 25, 1911.
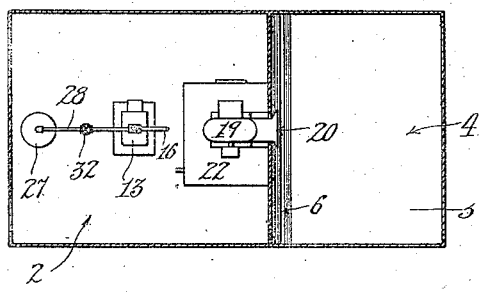
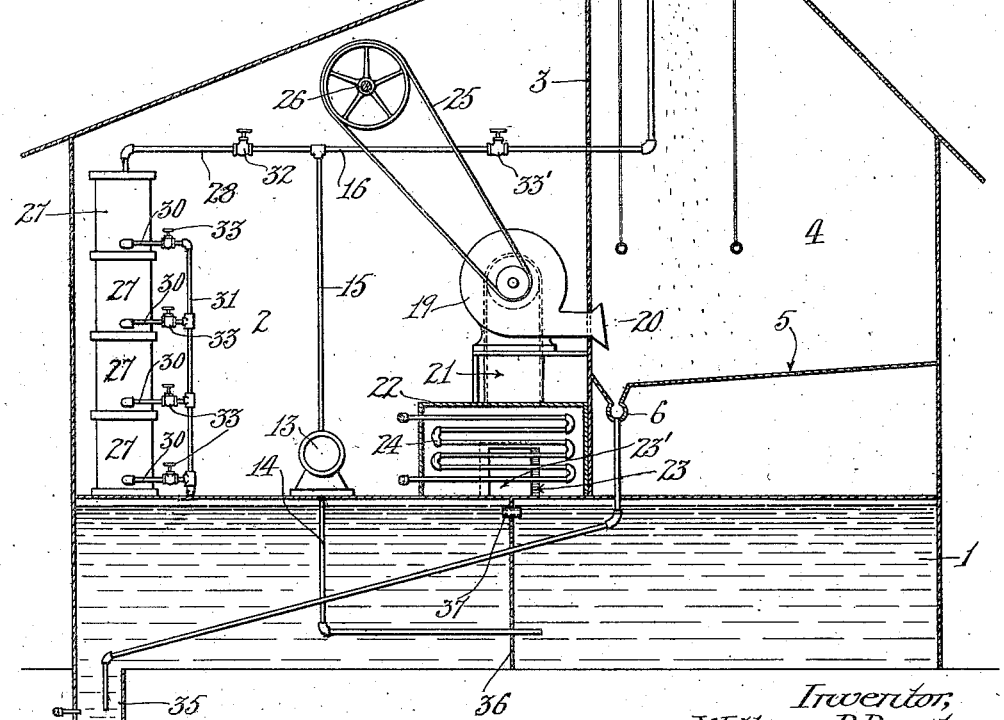
Inventor;
William P. Bending.

UNITED STATES PATENT OFFICE.

WILLIAM P. BENDING, OF LOS ANGELES, CALIFORNIA.

PROCESS OF TREATING HYDROCARBON OILS.

998,670. Specification of Letters Patent. Patented July 25, 1911.

Application filed December 14, 1908. Serial No. 467,557.

*To all whom it may concern:*

Be it known that I, WILLIAM P. BENDING, a citizen of the United States, residing at Los Angeles, in the county of Los Angeles and State of California, have invented a new and useful Process of Treating Hydrocarbon Oils, of which the following is a specification.

This invention relates to that step in the treatment of hydrocarbon oils which directly follows the neutralization of the acid, the present invention relating to the clearing of the oil or removal therefrom of the saponaceous and other by-products together with water.

The main object of the present invention is to effect removal of the water and other impurities in a rapid and economical manner.

Another object of the invention is to remove the bloom from hydrocarbon oils.

It has been necessary in the treatment of hydrocarbon lubricating oils to brighten or clarify them after the removal of the tar by acid and the neutralization of the acid by alkali to settle or expose the oil to the atmosphere for a considerable time, say a month, until the water and other volatile impurities have been separated or removed. The present invention provides for elimination of the water, etc., by an operation requiring but a few hours. It also enables the removal of the bloom from any hydrocarbon oil, either lubricating oil or kerosene, by the same rapid and economical treatment.

The accompanying drawings illustrate an apparatus suitable for carrying out the process.

Figure 1 is a vertical section of the plant. Fig. 2 is a plan thereof.

1 designates a tank which may be of rectangular form and is adapted to contain a quantity of oil required for say, one day's run. Over this tank is erected a room or building 2 for containing the apparatus for treating oil, said apparatus comprises means for subjecting the oil to the evaporating action of a current of warm air, while the oil is in a finely divided condition, means for circulating the oil in a continuous circuit and subjecting it to the aforesaid action at each circuit and also, if desired, means for finally filtering the oil.

A partition wall 3 extends vertically in the building 2 to form at one side thereof, between the walls of the building and the said partition wall, a chamber 4 whose floor 5 is inclined and is provided with a drain 6 at its lowest portion, this floor constituting a splash deck for the purpose hereinafter set forth. Extending upwardly from this chamber is a tower 8 having openings 9 at its upper end which are regulatable by means of dampers or shutters 10, a hood 11 being provided inside the tower for protection from the weather. Means are provided for elevating or pumping the oil from the reservoir or tank 1 to the upper part of this tower, said means consisting, for example, of a pump 13 having an intake pipe 14 extending down into the reservoir and an outlet pipe 15 one branch 16 of which extends near the top of the tower where it discharges into a funnel or trough 17 having a perforate bottom 18 adapted to discharge the oil in a thin stream, or spray so that the oil will become atomized or broken up in falling through the air in the tower. Means are also provided for producing an upward flow of heated air in said tower, said means consisting, for example, of a fan or blower 19 having its outlet 20 discharging into chamber 4 and having its intake 21 communicating with an air box 22 provided with an opening 23 adjustable by means of a sliding gate 23' and communicating with the outer air. A heating coil 24 is provided in the air box, supplied with steam or other heating medium from any suitable source. The pump 13 and blower 19 may be operated from any suitable driving means, for example, by belts 25 from a countershaft 26 which is driven from any suitable source of power. Filtering means may also be provided in the same plant said means consisting, for example, of a stack of filter sections 27 arranged in a vertical series, a pipe 28 leading from the outlet pipe 15 of the pump 13 to the top of this series, and a series of draw-off pipes 30 being provided from the lower portion of the respective sections 24 to a manifold pipe 31 whereby oil may be drawn from any one of the sections. Valves 32, 33 may also be provided in the pipes 16, 28 aforesaid to enable oil to be directed from the pump 13 to the tower 8 or to the filter, as desired. The drain pipe 6 from the splash deck 5 leads to a well 35 at one end of the oil reservoir 1. The circulating pump 13 draws oil by means of pipe 14 from the portion of said reservoir remote from said well, a partition or wall 36 being preferably interposed between these two portions of the reservoir with an intercommunicating passage or pipe 37 at the upper part of the reservoir to allow oil to flow from the said receiving end of the reservoir to the delivering end thereof.

The process is carried on as follows: Oil sufficient for a run is supplied into tank 1, for example, through an intake 40. The machine being set in operation pump 13 draws oil from the receiving end of the tank 1 and forces it through pipes 15, 16, to the trough 17 at the top of the tower 8. During this operation valve 33 is closed and valve 34 is opened to allow the oil to flow, as stated. The oil falls from trough 17 through the tower 8 and in its descent encounters the ascending current of air in said tower which is produced by the blower 19. The operation of the blower 19 draws air from the inlet opening 23 through the air box 22 wherein the air is warmed to a suitable temperature, and forces this warm air into the chamber 4 whence the warm air passes upwardly through the tower 8. As the oil descends through the body of air in the tower 8 it is broken up by the resistance of the air and the upward movement of the air tends to more effectually break up or atomize the oil. Each particle or drop of oil is thus exposed to the effect of the warm air so that moisture and other volatile impurities in the oil are rapidly and effectually removed therefrom and are discharged with the air at the top of the tower. The oil from the tower passes through the chamber 4 where it is further subjected to the action of the warm air and finally falls on the splash deck 5 from which it drains into pipe 6 leading it back to the well 35 at the receiving end of the reservoir 1. The oil accumulating in this end of the reservoir eventually flows over into the other end through communication 37 aforesaid, and there is thus established a continuous circulation, the oil being subjected to the action of the warm air at each circuit. By the provision of the partition 36, between the two ends of the reservoir 1, the body of oil accumulating in the receiving end, that is to say, the end which receives the oil from the pipe 6, is kept separate from the oil in the other end so that the water or other heavy impurities may settle in the receiving end and be withdrawn from the well 35, the communicating means 37 being located at the upper portion of the reservoir so that only the pure portion of the body of oil in the receiving end passes over into the delivery end of the reservoir. In a comparatively short time, say one day, the entire body of oil can thus be purified. The effect is to remove any water or other volatile matter which may be present and to improve the general quality of the oil, for example, in lubricating oils, the effect is to render the oil more smooth, and in case of kerosene the effect is to render the oil more sparkling and less liable to smoke in burning. When the entire body of oil in reservoir 1 has thus been treated it may be drawn off either directly or through the filter 24 the oil being passed through one or more sections of the filter in series according to the amount of decoloration required.

Suitable filtering material may be placed within the filter 24 which will, while purifying the oils, impart a suitable coloring matter thereto in order that the finished oils may have any desired color or appearance. By the use of my improved apparatus and process of treating hydrocarbon oils, those elements contained in the oils, which impart to the same an undesirable "bloom", are removed and the oils treated by the said process are bright and more marketable than oils produced by former treatments.

What I claim is:

The process of purifying oil which consists in causing the oil to fall in a finely divided condition in contact with an ascending current of heated air, said air being warmer than the oil, intercepting the descent of the oil by a surface and thereby causing the oil to be splashed and thereby broken up and brought into intimate contact with the heated air, collecting the oil and delivering the oil so collected into the bottom portion of a body of oil, continuously, drawing off oil from the upper portion of said body of oil and again subjecting it to division and exposure to the heated air, and then returning it to the said body of air, and continuously circulating the oil in this manner until it is purified.

In testimony whereof, I have hereunto set my hand at Los Angeles, California, this 5th day of December 1908.

WILLIAM P. BENDING.

In presence of—
F. M. TOWNSEND,
FRANK L. A. GRAHAM.